(12) United States Patent
Nelson et al.

(10) Patent No.: US 10,171,290 B1
(45) Date of Patent: Jan. 1, 2019

(54) SYSTEMS AND METHODS FOR REAL-TIME CORRECTION OF CORE APPLICATIONS

(71) Applicant: Sprint Communications Company L.P., Overland Park, KS (US)

(72) Inventors: Rodney Nelson, Overland Park, KS (US); Mark Peden, Olathe, KS (US); Kamran Qadir, Overland Park, KS (US); Raymond Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 321 days.

(21) Appl. No.: 15/247,526

(22) Filed: Aug. 25, 2016

(51) Int. Cl.
*H04L 12/24* (2006.01)

(52) U.S. Cl.
CPC .......... *H04L 41/0668* (2013.01); *H04L 41/12* (2013.01)

(58) Field of Classification Search
CPC .................. H04L 41/0668; H04L 41/12
See application file for complete search history.

(56) References Cited

U.S. PATENT DOCUMENTS

| 2012/0230210 A1* | 9/2012 | Reed ............ H04L 43/028 370/252 |
| 2013/0191920 A1* | 7/2013 | Amit ............ H04L 63/166 726/25 |

OTHER PUBLICATIONS

Ulf Lamping, Wireshark User's Guide for Wireshark 2.1, May 27, 2016, Wireshark, https://web.archive.org/web/20160527043947/https://www.wireshark.org/docs/wsug_html/#Preface (Year: 2016).*

* cited by examiner

Primary Examiner — Wing F Chan
Assistant Examiner — Billy H Ng

(57) ABSTRACT

A method for correcting connectivity failures of core applications on a user equipment (UE) is disclosed. The method comprises a client detecting a plurality of request-reply message sequences between a core application and a corresponding server, and learning a set of request-reply message sequences within the plurality of request-reply message sequences that are not producing a connection error with the corresponding server. The method further includes creating a series of ghost replies that each mimic a reply that is one of the set of learned replies coming from the corresponding server and not producing a connection error, and then retaining the series of ghost replies. The method then includes detecting at least one connection error between the core application and the corresponding server, and feeding a ghost reply to the core application.

20 Claims, 7 Drawing Sheets

SYSTEMS AND METHODS FOR REAL-TIME CORRECTION OF CORE APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices—such as smart phones and wearable devices—may be capable of running and interacting with a plurality of user applications, sometimes referred to as application software. A mobile communication device may be referred to in some contexts as a user equipment (UE). In a layered model of computing architecture, user applications on the UE operate at the highest level (i.e. the application layer) and include programs that are designed for an end user to enable the UE to perform a group of coordinated functions, tasks, or activities. Examples of user applications that operate at the highest level include, but are not limited to, social media applications, weather applications, sports applications, gaming applications, finance applications, travel applications, and a wide variety of other software for end user interaction on a UE. The layered model for the UE also includes a system level that may operate between the hardware level for the UE's hardware and the highest level for the user applications. User applications are at least partially dependent on system software at the system level (e.g., core applications) to execute on the UE. The system level includes system software that interfaces between the hardware and user applications, and also manages aspects of hardware and software resources on the UE. Examples of system software may include, but are not limited to, operating systems, firmware, and core applications such as assemblers, utility programs, compilers, debuggers, file management tools, or other core applications that interface and manage hardware and software resources.

SUMMARY

In an embodiment, a method for correcting connectivity failures of core applications on a user equipment (UE) is disclosed. The method comprises detecting, via execution of a client on a processor of the UE, a plurality of request-reply message sequences between a core application of a plurality of core applications and a corresponding server. The method includes learning, by execution of the client, a set of reply messages within the plurality of request-reply message sequences that are coming from the corresponding server and not producing a connection error with the corresponding server. Based on the set of reply messages, the method continues with creating, by execution of the client, a series of ghost replies that each mimic a reply that is one of the set of learned replies coming from the corresponding server. The method includes retaining, by execution of the client within the memory of the UE, the series of ghost replies, and subsequent to retaining the series of ghost replies, detecting, by the client, that the core application has exceeded a threshold number of request messages that are unanswered by the corresponding server due to a lack of reply by the corresponding server. Based on the detecting, the method includes feeding, by execution of the client, a ghost reply from the retained series to the core application.

In an embodiment, a system for correcting connectivity failures of core applications on a user equipment (UE) is disclosed. The UE comprises a transceiver; a memory storing a plurality of core applications; a processor; and a client stored in the memory that, upon being executed and configuring the processor, the processor: detects a plurality of request-reply message sequences between a core application of the plurality of core applications and a corresponding server via the transceiver. The processor is configured to learn, over a defined time period, a set of reply messages within the plurality of request-reply message sequences that do not produce a connection error with the corresponding server. The processor is also configured to create a series of ghost replies that each mimic a reply that is one of the set of learned replies coming from the corresponding server and not producing a connection error, and then retains the series of ghost replies within the memory. Subsequent to retention of the series of ghost replies, the processor detects that the core application has exceeded a threshold number of request messages that are unanswered by the corresponding server due to a lack of reply by the corresponding server. Based on the detection, the processor feeds a ghost reply from the retained series to the core application.

In an embodiment, another method for correcting connectivity failures of core applications on a user equipment (UE) is disclosed. The method includes detecting, via execution of a client on a processor of the UE, a plurality of request-reply message sequences between a core application of a plurality of core applications and a corresponding server. The method continues with learning, by execution of the client over a defined time period, a set of reply messages within the plurality of request-reply message sequences that are not producing a connection error with the corresponding server. The method includes creating, by execution of the client, a series of ghost replies that each mimic a reply that is one of the set of learned replies coming from the corresponding server and not producing a connection error. The method continues with retaining, by execution of the client, the series of ghost replies on a memory communicatively coupled to the UE via a wireless network, and determining, by the client, that the core application is experiencing a frequency of connection errors with the corresponding server in excess of a predefined threshold. Responsive to the frequency of connection errors exceeding the predefined threshold, the method continues with obtaining, by the client, a ghost reply from the retained series corresponding to the core application, and then feeding, by execution of the client, the ghost reply from the retained series to the core application, wherein the ghost reply maintains execution of the core application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
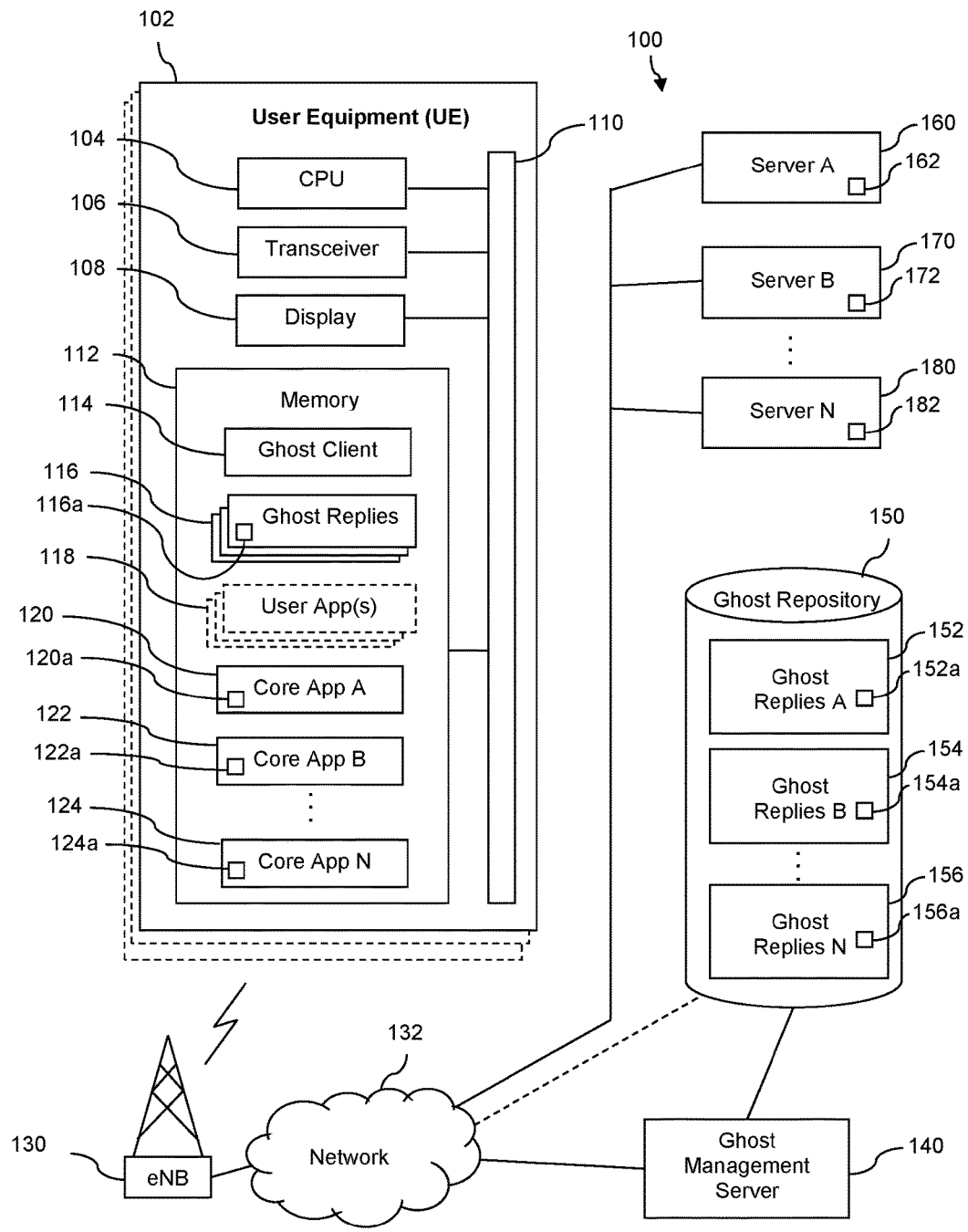
FIG. 1 is a diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When a user launches and interacts with user applications on their UE, these user applications may at least partially depend on the continued execution and proper functioning of core applications running behind the scenes on the UE at the system level. Core applications are distinct from user applications (which are designed to be end user facing) because core applications are system software programs that run at the system level of the UE and may be restricted from user modifications and updates. Core applications may be integrated with embedded firmware and/or the operating system and thus operate at the system level. During the manufacturing process, destination addresses (such as, uniform resource locators (URL), internet protocol (IP) addresses, media access control (MAC) address, or other uniform resource identifiers) to a particular server may be integrated into core applications and the core applications may rely on or depend on connectivity to that particular server via the destination address in order to function properly (i.e., continue execution at the system level without generating errors and crashing user applications).

A wireless service provider may provide wireless connectivity to a network for millions of UE's, and during the lifecycle of each UE (i.e., the time between manufacturing and production of the device until the UE is no longer operational and/or supported on a network). When functioning properly, the core applications may use their embedded destination address to connect with corresponding servers (e.g., domain name system (DNS) servers, policy servers, reporting servers, or other servers that support system level functioning) through a request-reply message sequence. The core application may initiate each request-reply message sequence with a request call message to the corresponding server and, in response, receive a reply message with reply information expected by the core application. However, given that the lifecycle of a UE can be multiple years (i.e., the time between manufacturing and production of the device until the UE is no longer operational and/or supported on a network), there is a potential for destination addresses that are embedded within the core applications to become outdated. The destination addresses may become outdated due to the destination address for a core application no longer existing at the corresponding server and thus no longer being in service, due to the resources at the destination address changing to another address unknown to the core application, and/or due to a server corresponding to the destination address no longer being in operation or accessible to the core application on the UE.

When the destination address becomes outdated, it can result in the core application repeatedly making request calls to that destination address and not receiving the anticipated reply or any reply at all, thereby causing a connection error. This can result in at least the core application getting hung up (i.e., repeatedly making call requests in a continuous loop without receiving a reply) and potentially impacting the functionality of the hardware and user applications. A wireless service provider may provide wireless connectivity to a network for millions of UE's, and thus request messages that go unanswered can result in connection errors affecting connectivity and user experience. The impact of connection errors on the UE from core applications may include slowed processing for user applications, continuous error messages on a user interface, and/or multiple service-impacting issues across the entire UE, such as causing transceiver connectivity over a specified wireless band to be dropped or limited on the UE despite adequate signal to the UE. For example, when a core application cannot connect to the destination address at a corresponding server, the core application may produce errors that cause the UE to drop from a faster Long-Term Evolution (LTE) connection to a relatively slower 3G connection despite the UE being within range of an LTE signal. Additionally, another layer of technical complexity in resolving the errors is added when both the UE and the network server of the wireless service provider are unable to access or correct the destination address on the server side, and when the UE and network server are restricted from updating or patching the destination address itself at the system level of the UE.

Some embodiments of the present disclosure teach systems and methods of dynamically mitigating and correcting connectivity failures of core applications because they are unable to connect to a corresponding server. In an embodiment, a client resides on a UE at the system level, which is below the highest level (also referred to as the applications level or layer) where user applications operate on the UE. The client may be referred to as a ghost client and/or proxy client because it mimics the actions of a server without alerting or informing the core application on the UE of its presence or that there exists a connectivity error with the server. In some embodiments, the client (referred to hereafter as ghost client) may be written at the time of manufacture of a chipset on the UE (i.e., before being used by a user of the UE) to a read-only portion of memory, integrated with firmware on the UE, and/or embedded in a kernel of the operating system on the UE, and thus may not be patched and/or updated by a customer. As core applications use their embedded destination address (e.g., an embedded URL) to initiate request messages to a corresponding server, the ghost client detects the plurality of request-reply message sequences between each core application and corresponding server, along with the destination address being used in that request-reply message sequence. Over a defined period of time, the ghost client learns which request-reply message sequences are successful (i.e., do not cause the core application to produce a connection error, thereby ceasing the request-reply message sequence) and which are not successful (i.e., does cause the core application to produce a connection error due to an unanticipated reply or lack of reply, thereby causing repeated reattempts at connection). Once the ghost client learns a set of reply messages within the plurality of request-reply message sequences that do not produce a connection error with the corresponding server, the ghost client can create a series of ghost replies that each mimic a successful reply for one of the request-reply message sequences for a particular core application. The ghost client may then store the series of ghost replies for later retrieval.

To prevent situations where one of the core applications repeatedly calls an invalid destination address, the ghost client detects when a core application repeatedly calls a destination address above a defined threshold number of attempts without being able to connect with the corresponding server of that address. The ghost client may monitor the communication bus for request-reply message sequences pertaining to the core applications and determine whether the core application is unable to connect due to the UE being unable to connect with the wireless network thereby affecting all applications (in which case the ghost client might not intervene), or whether the lack of connection is due to an invalid destination address (in which case the ghost client would intervene). Once the ghost client determines that the destination address embedded in the core application on the UE is no longer valid, the ghost client can determine which request-reply message sequence corresponds with the failed request and obtain the ghost reply that corresponds with the unanswered request message for the core application. The ghost client can then feed the ghost reply to the core application in response to the request message of the core application, and thus complete the request-reply message sequence as if the core application had been able to connect with the corresponding server but without actually doing so. In response to the ghost client feeding the ghost reply to the core application, the core application receives the ghost reply from the client instead of receiving a reply from the server, interprets the ghost reply as coming from the corresponding server, and maintains execution at the system level to support the user applications and avoid the core application from crashing and/or timing out.

In some embodiments, the ghost client executing at the system level on the UE may initiate a call to a ghost management server in response to one of the core applications experiencing a threshold number of failed request-reply message sequences. The ghost management server may confirm that the destination address embedded in the core application on the UE is invalid (i.e., not working and/or non-responsive) and, in response, the ghost management server may redirect the ghost client on the UE to another ghost reply comprising an alternate destination address to a different server that the core application is not programmed to be aware of. The ghost client on the UE may then feed the newly received ghost reply to the core application, where the new ghost reply permits the core application to continue execution at the system level. Additionally, the ghost client may focus detection on only applications running at the system level of the UE so as not to overwhelm and otherwise impede UE processing resources. This may improve the functioning of the computing device by preemptively determining and preventing crashes on the UE, thereby allowing for a more robust and stable execution environment for the multiple UE's operating on the wireless network.

The preceding paragraphs are not intended to be limiting, but are illustrative of example benefits of the system and methods described by this disclosure according to some embodiments. Examples of systems and methods will now be described in more detail according to some embodiments of the present disclosure.

Turning now to FIG. 1, an illustration of an example configuration of system 100 is provided. In an embodiment, the system 100 comprises a UE 102, network equipment 130 (e.g., an eNodeB, base transceiver station, cell tower, edge node, etc.), a plurality of servers (e.g., server A 160, server B 170, through server N 180), a network 132 (e.g., a carrier-based network using LTE, 4G, 3G, a cloud network, etc.), a ghost management server 140, and a ghost repository 150 (e.g., a data store comprising non-transitory memory. Within system 100, communication links between the UE 102 and servers that connect to network 132 may be at least partially established wirelessly via network equipment 130 and/or via wired links via network 132. Although the illustrated embodiment of system 100 comprises a single UE 102, a single network equipment 130, a single network 132, a single server 140, and a single repository 150, and servers A 160 through server N 180, it is understood that, in some embodiments, the system 100 may comprise more than one of the illustrated devices and components in varied form factors and/or any combinations thereof that operate and execute concurrently and/or consecutively.

The UE 102 may include a variety of form factors, such as a mobile phone (including smart phones), tablet computer, wearable computing device, digital media player, electronic book readers, a personal computer having an integrated or external wireless network communication device, game platforms, or other non-generic devices configured with wired and/or wireless communication.

Figure 4:
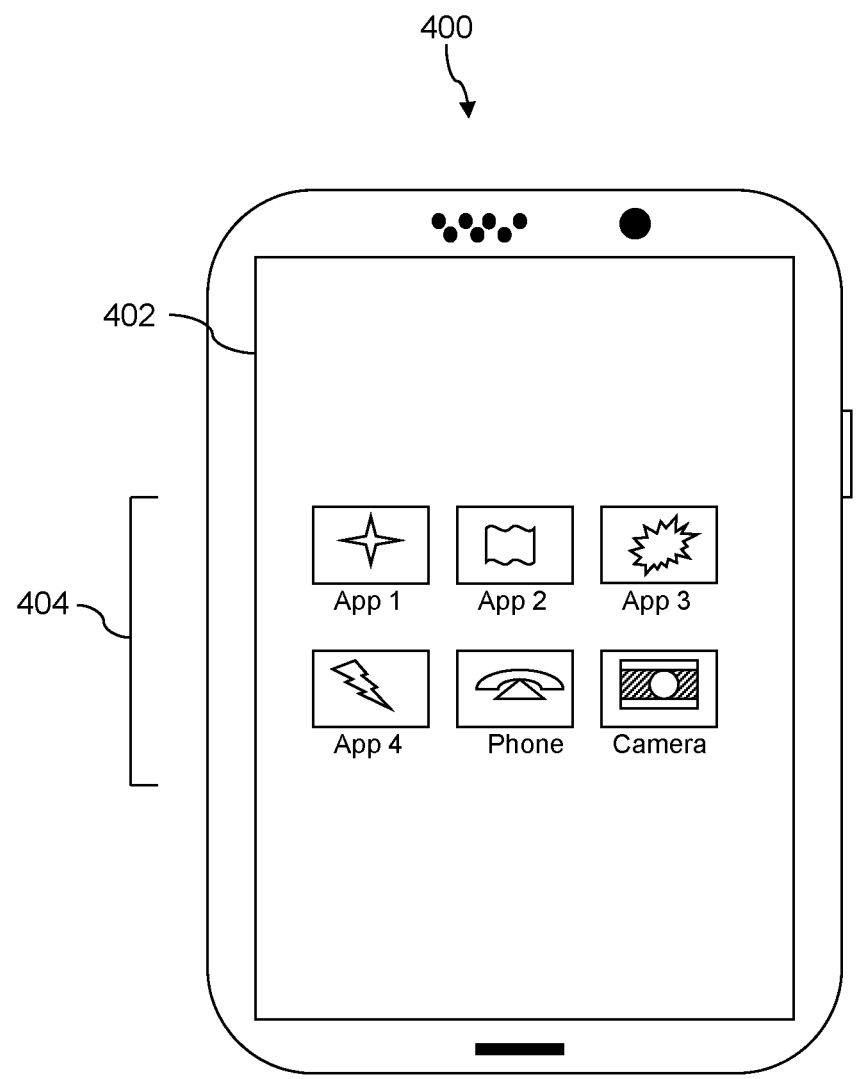
FIG. 4 is an illustration of a user equipment according to an embodiment of the disclosure.

In an embodiment, aspects of UE 102 depicted in system 100 are illustrated in the block diagram of UE 400 in FIG. 4. As shown in FIG. 1, the UE 102 comprises a communication bus 110 that communicatively couples processor(s) 104, transceiver(s) 106, display(s) 108, and memory 112. The UE 102 may be configured to communicate with network equipment 130 (e.g., one or more eNodeB(s), base station (BS), or other type of wireless wide area network (WWAN) access points) via transceiver 106 and one more antennas. The UE 102 is configured to communicate with network equipment 130 and thus access network 132, using at least one wireless communication standard, such as 3GPP LTE, WiMAX, High Speed Packet Access (HSPA), Code Division Multiple Access (CDMA), Global System for Mobile Communication (GSM), Bluetooth®, Wi-Fi, or any combination thereof. Embodiments of network 132 may comprise a public network, private network, wired network, wireless network, or any combination thereof and comply with the wireless standards discussed above. The display 108 may comprise a user interface, which in some embodiments may be configured to include a touch screen that provides data input from a user and visual output on the display.

The memory 112 is readable by one or more processor 104 via at least one communication bus 110 and the memory 112 includes a non-transitory storage medium having non-volatile memory and/or storage elements. In the embodiment of UE 102 illustrated in FIG. 1, memory 112 comprises ghost client 114, ghost replies 116, and one or more core applications, such as core application A 120, core application B 122, and continuing through a defined number core application N 124. UE 102 is configured according to a layered model of computing architecture, and thus each of the ghost client 114, ghost replies 116, and core applications 120, 122, 124 are stored at, and execute from, a system level of the UE 102, where the system level is between the hardware level for the UE 102's hardware (e.g., processor(s) 104, transceiver 106, display 108, etc.), and the highest level of execution for end user interaction (e.g., where user applications 118 are stored and execute from). It is understood that ghost client 114 and core applications (e.g., 120, 122, 124) are distinct from user applications 118 because unlike user applications 118 that can be readily modified, updated, and patched from end user input via display 108, the ghost client 114 and core applications (e.g., 120, 122, 124) may be embedded in firmware and/or a kernel of an operating system and therefore reside in memory 112 that is protected from alteration, updates, patches, or other modifications by the end user. In some embodiments, any of the ghost client 114, core application A 120, core application B 122, and up to core application N 124 cannot be viewed or altered in memory based on user input via display 108 because they are written to once onto a chipset in memory 112 at the time of manufacture of UE 112.

In some embodiments, UE 102 may comprise one or more user applications 118 which, unlike ghost client 114 and core applications A-N 120, 122, 124, are stored on the UE 102 in readable and writable memory because the user applications 118 execute at the highest level in a layer model of computer architecture and include programs that are designed for an end user interaction via display 108. Examples of user applications 118 that operate at the highest level include, but are not limited to, social media applications, weather applications, sports applications, gaming applications, finance applications, travel applications, and a wide variety of other software for end user interaction on a UE 102. The user applications 118 may be updated, deleted, reinstalled, crash and/or cease functioning without affecting other operations on the UE 102 and/or without adversely affecting how applications at the system level of the UE 102 execute (i.e., ghost client 114, core applications A-N, 120, 122, 124 respectively).

Conversely, because the core applications A 120, B 122, through N 124 operate alongside the operating system, are stored in protected memory and interface between the hardware (e.g., processor(s) 104, transceiver 106, display 108, etc.) and user applications 118, the end user is prevented from updating, deleting, and/or reinstalling the core applications A-N, 120, 122, 124 and the service provider may not have permission to access or alter the core applications A-N, 120, 122, 124 on the UE 102. Additionally, when any of the core applications A-N, 120, 122, 124, malfunction and/or crash, such as due to errors in connectivity that cause timeouts, it affects the user applications 118 and/or forces undesirable hardware functions such as forcing the transceiver 106 to switch to a lower bandwidth connection (e.g., from a Wi-Fi or LTE connection to a 3G connection) despite having adequate reception and channel availability on the network 132.

Some embodiments of a core application A 120, core application B 122, and/or core application N 124 include system software such as, but are not limited to, a connection optimizer for network connectivity, roaming management, UE firmware, assemblers, utility programs, compilers, debuggers, file management tools, or other core software that interface and manage hardware and software resources which are unable to be modified by an end user.

In an embodiment, the ghost client 114 configures the processor to detect a plurality of request-reply message sequences between at least one core application (e.g., core application A 120) and a server corresponding to that core application (e.g., server A 160). As used here, use of the term corresponding server refers to a server that corresponds to at least one core application on the UE 102 and where that server cannot be modified, controlled, or altered by the UE 102 and/or a service provider that is associated with ghost management server 140. In system 100, for example, server A 160 is the corresponding server for core application A 120 on UE 102 because the destination address 162 associated with server A 160 corresponds with destination address 120a that is an embedded link within core application A 120. Similarly, core application B 122 has destination address 122a, which may be stored as an embedded link, corresponding to server B 170 at destination address 172. Put simply, the destination address (e.g., destination address 124a) embedded in a core application (e.g., core application N 124) on the UE 102 is supposed to match the destination address of the corresponding server (e.g., destination address 182 of server n 180) during a request-reply message sequence.

In an embodiment, as the core applications execute on the UE 102, each core application may aperiodically engage in a request-reply message sequence. Each request-reply message sequence may include a request message initiated by a core application, and in response, a reply message from the corresponding server. Each reply message in a completed request-reply message sequence corresponds with a particular request message from a core application and thus the reply message is considered by the core application as being an anticipated response. Execution of a core application on the UE 102 is maintained and continues when the core application receives a reply message comprising information that the core application associates with request message that was sent as part of the request-reply message sequence, thereby completing the sequence without a connection error. For example, core application A 120 may initiate a request-reply message sequence by transmitting a request message to server A 160 using destination address 120a. In some embodiments, the request message sent by a core application (e.g., any of core applications 120, 122, 124) may comprise a header and a content payload, where the header includes the destination address 120a that is viewable via the communication bus 110. A header may correspond with a request for status to determine whether the destination address of the corresponding server is at least one of "alive", "dead", "in maintenance". The content payload may include information about operations of the core application at the system level of the UE 102, which are also encrypted and/or obscured from being viewed by the ghost client 114.

In some embodiments, when the core application A 120 is connected to server A 160, the server A 160 may identify the header and respond to core application A 120 with a reply message comprising reply information that includes at least one of "alive" or "in maintenance". When the core application A 120 receives a reply message that includes information of "alive" or "in maintenance", the core application continues execution and does not produce a connection error. However, if the core application A 120 receives a reply message that includes "dead" status, the core application A 120 interprets this as a connection error and reattempts the request message until it receives a reply message corresponding with "alive" or "in maintenance." It is understood that, in some embodiments, each core application produces a connection error in response to not receiving reply information that the core application anticipates based on the request message sent to the destination address, and thus alternate reply information such as an "ok" response or other reply packets may be anticipated. When a core application receives reply information that is anticipated, associated with a corresponding server, and is in response to the request message, the request-reply message sequence is considered complete without producing a connection error.

To improve the processing on the UE 102 and not overwhelm the processor 104, in some embodiments, the ghost client 114 may detect and monitor only the header showing the status in the request messages coming from core applications on the UE 102 via the communication bus 110. In some embodiments, the ghost client 114 may be embedded in a modem of the UE 102 to monitor traffic of core applications. The ghost client 114 may also reduce a processing burden on the UE 102 by ignoring the communication activities coming from user applications 118 via the communication bus 110. In some embodiments, the ghost client 114 may detect and learn information about core applications in real-time, that is, the information (e.g., request-reply sequences) is monitored from data traffic as the data traffic is being transmitted or received via the communication bus, and analyzed as soon as possible after the information is collected by the ghost client 114. Said in another way, the term real-time as used herein means that the information obtained by the ghost client 114 is detected, learned, monitored, measured, collected, transmitted, and/or analyzed as events happen versus performing one or more of these actions in a batch processing mode of operation. In an embodiment, real-time detection, creating, feeding, measurement, collection, transmission, and analysis of information related to an event may take place in less than a defined time period, such as but not limited to less than 10 seconds, in less than one minute, in less than five minutes, or in less than fifteen minutes.

In some embodiments, over a defined time period—such as but not limited to 10 seconds, one minute, ten minutes, one hour, twenty-four hours, one week, one month, or any time increment there between—the ghost client 114 learns which destination addresses correspond with each core application, which reply messages within a plurality of request-reply message sequences are coming from a corresponding server 160, 170, 180, and also which of the reply messages do not produce a connection error that cause the core application to reattempt another request message. Put simply, the ghost client 114 learns reply messages that comprise reply information that enables the particular core application to continue executing and not time out, and assembles these reply messages into a set.

In some embodiments, the ghost client 114 learns which set of reply messages do not produce connection errors by identifying the reply information from the corresponding server in response to the request message from a core application, and then in response to reception of the reply message, the ghost client 114 determines that the core application does not immediately (i.e., upon receipt of the request message) re-attempt the same request message, and thus does not produce a connection error. Based on learning the set of reply messages that do not produce and/or yield a connection error for a core application, the ghost client 114 creates a series of ghost replies 116 for the core application. Each ghost reply is configured by the ghost client 114 to mimic a reply that is one of the set of learned replies coming from the corresponding server within the request-reply message sequence, and thus is interpreted by the core application as if the ghost reply is actually being transmitted from a corresponding server in response to the particular request message sent. Put simply, the ghost client creates a ghost reply that comprises reply information which would typically be sent by a corresponding server 160, 170, 180. In some embodiments, the ghost client 114 may mask its identity from the core application by including identifying information from the corresponding the server, such as an internet protocol (IP) address and/or destination address of the corresponding server that is anticipated by the core application.

In an embodiment, the ghost client 114 retains the series of ghost replies 116 in memory 112 of the UE. In some embodiments, the ghost client 114 instantiates an identifier 116a for the series of ghost replies 116, where the identifier 116a associates the series of ghost replies 116 with the particular core application, such as core application A 120. Although one series of ghost replies 116 is illustrated in FIG. 1, it is understood that in some embodiments, more than one series of ghost replies is retained in the memory 112 of the UE 102. In some embodiments, each core application on the UE 102 (e.g., core application A 120, core application B 112, and core application N 124) is associated with their own series of ghost replies each comprising an identifier. In an embodiment, the ghost client 114 initiates a communication session with ghost management server 140 to report that the series of ghost replies 116 has been created on the UE 102, and the series of ghost replies 116 includes identifier 116a which corresponds with one of the core applications on the UE 102, such as core application A 120. It is understood that a series of ghost replies includes one or more ghost replies for a particular core application.

In some embodiments, the ghost management server 140 retains one or more series of ghost replies in the memory of ghost repository 150. For example, when the ghost client 114 creates the series of ghost replies 116 and marks identifier 116a as being associated with core application A 120, the ghost client may relay the series of ghost replies 116—and the mimicked reply information therein—to ghost management server 140, which in turn retains them in ghost repository 150 as ghost replies A 152 having reply identifier 152a, where reply identifier 152a corresponds with identifier 116a so that the ghost management server 140 can later determine that ghost replies A 152 are associated with the series of ghost replies 116. Similarly, ghost replies B 154 having reply identifier 154a may be created to correspond with another series of ghost replies that are created for core application B 122 having destination address 122a. In an embodiment, the ghost management server 140 may retain as many series of ghost replies as there are core applications (i.e., an N number of core applications), and thus ghost replies N 156 having identifier 156a would correspond with a series of ghost replies for the core application N 124 having destination address 124a.

In an embodiment, the ghost client 114 determines that a series of ghost replies does not exist on the UE 102 and/or cannot be created for a particular core application on the UE 102 (e.g., core application B 122). In this embodiment, the ghost client 114 may initiate a request to a ghost management server 140 for a series of ghost replies that correspond to core application B 122. In response, the ghost management server 140 may detect that identifier 154a of ghost replies B 154 corresponds with core application B and destination address 122a, and in turn, the ghost management server 140 retrieves the series of ghost replies B 154 and transmits them to the UE 102 for use by the ghost client 114.

Subsequent to the series of ghost replies 116 being retained in the UE 102 and/or within ghost repository 150, the ghost client 114 the number of request messages to a corresponding server that go unanswered within a request-response sequence. In some embodiments, the request message from a core application (e.g., core application A 120) may not be answered by a corresponding server (e.g., 160) due to a lack of reply and/or receiving a reply that does not include the reply information that the core application is anticipating. In some embodiments, the lack of reply by the corresponding server is based on at least one of a destination address (e.g., a uniform resource locator) no longer existing at the corresponding server and the corresponding server no longer being in operation. For example, the core application A 120 may initiate a request-reply message sequence by sending a request message to the destination address 120a that is supposed to correspond with server A 160; however the destination address 162 may have changed for server A and thus no longer exist. As such, the destination address 120a embedded within core application A 120 no longer matches destination address 162 of server A 160, and the corresponding server A 160 may not respond with a reply message and/or respond with an alternate reply message that the core application is not anticipating, thus causing a connection error. In some embodiments, the corresponding server (e.g., server A 160) may ignore request messages from the core application of the UE 102 and/or be taken out of operation by a third party operator managing the corresponding server, and thus not send a reply message with the anticipated reply information in response to the request message from the core application (i.e., the request message is unanswered by the corresponding server due to a lack of reply).

In some embodiments, the ghost client 114 is configured to detect when the core application (e.g., 120) sending the request messages has exceeded a threshold number of request messages that do not receive a reply from a corresponding server (e.g., 160)—that is, more than a defined number of request messages using the embedded destination address that are unanswered by the corresponding server (e.g., 160). In some embodiments, the threshold number of request messages is learned by the ghost client 114 based on how many request messages can be sent without a reply before processing resources on the processor 104 and user applications 118 become affected and slow down relative to when a reply message is received and does not yield a connection error. In some embodiments, the threshold number may include at least two request message attempts, at least three, at least five, at least ten, at least twenty, and at least fifty.

Once the ghost client 114 detects that the core application (e.g., any of core application A 120, core application B 122, core application N 124, etc.) has exceeded a threshold number of request messages that are unanswered by the corresponding server (e.g., server A 160, server B 170, server N 180, respectively), the ghost client 114 may identify which series of ghost replies is associated with the core application and request-reply message sequence. In some embodiments, this may be accomplished by the ghost client 114 determining that the destination address of the core application (e.g., identifier 120a of core application A 120) corresponds with one of the identifiers of the series of ghost replies (e.g., identifier 116a of ghost reply 116), and thus one or more ghost replies are retrievable based on the identifier. In some embodiments, the ghost client 114 may determine whether the core application sending the unanswered request message is associated with a security restriction that is defined by the operating system of the UE 102 at the system level. A security restriction may be implemented by the operating system to allow for connection errors to exist for error reporting purposes, and thus the ghost client 114 may selectively allow only those core applications having the security restriction to continue sending request messages even though they may go unanswered. In embodiments where the ghost client 114 checks for a security restriction, the ghost client 114 may proceed with using a ghost reply (e.g., by feeding a ghost reply to the core application) responsive to determination that the core application is not associated with a security restriction.

In some embodiments, the ghost client 114 obtains a ghost reply from the retained series (e.g., from ghost replies 116) and feeds the ghost reply to the core application based on the detection of the core application exceeding the threshold number of request messages. For example, the ghost client 114 may obtain a ghost reply from the series of ghost replies 116 and then feeds the ghost reply to the core application A 120 experiencing the unanswered request. The core application A 120 may not recognize that it is receiving the ghost reply instead of the reply message from the corresponding server, such as server A 160, because the ghost reply comprises the reply information that was mimicked from a reply message that would have been sent by the corresponding server. In some embodiments, the core application may not be able to identify that the ghost client is feeding it the reply information via the ghost reply because the ghost client 114 injects the ghost reply into the data stream of the communication bus 110 such that the core application A 120 receives the message in the same manner as it would have otherwise been received from the corresponding server.

In some embodiments, the ghost client 114 verifies that the ghost reply sent to the core application was accepted by the core application without the core application actually making a connection with the corresponding server. Thus, the core application receiving the ghost reply (e.g., core application A 120) does not make a connection with the corresponding server (e.g., server A 160) based on receipt of the ghost reply even though the core application processes the ghost reply as if a connection had been made and was successful. The ghost reply fed to the core application induces the core application to continue execution on the UE 102 and cease making request attempts in response to receipt of the ghost reply. In an embodiment, the ghost client 114 verifies that the ghost reply was accepted by confirming that the core application ceases sending request messages based on receipt of the ghost reply. As such, the core application does not receive at least one of an update and patch from a server external to the UE 102 in order to resolve connection errors, and thus the ghost client does not alter and/or overwrite any part of the core application executing on the system level.

In some embodiments, the ghost client 114 may receive updates from the ghost management server 140. For example, the ghost client 114 may be instructed by the ghost management server 140 to change the threshold number of request message attempts for a particular core application on the UE 102. Each core application may have the same and/or different threshold number and in some embodiments, this threshold number may be adjusted for each core application ad hoc based on what the ghost client 114 learns from observations on the UE 102 and/or based on what the ghost management server 140 learns from observing multiple (e.g., hundreds, thousands, millions, etc.) ghost clients on multiple UE's across the network 132. This may improve the functioning of each UE 102 that has a ghost client 114 by reducing application timeouts, processor stalls, and network traffic from core applications. In some embodiments, the ghost management server 140 may overwrite one or more ghost replies 116 with a ghost reply from the ghost repository 150, such as overwriting some ghost replies 116 corresponding to core application A 120 with ghost replies A 152, overwriting some ghost replies corresponding to core application B 122 with ghost replies 154, and so on through those ghost replies 116 corresponding with core application N 124 with ghost replies n 156.

Figure 2:
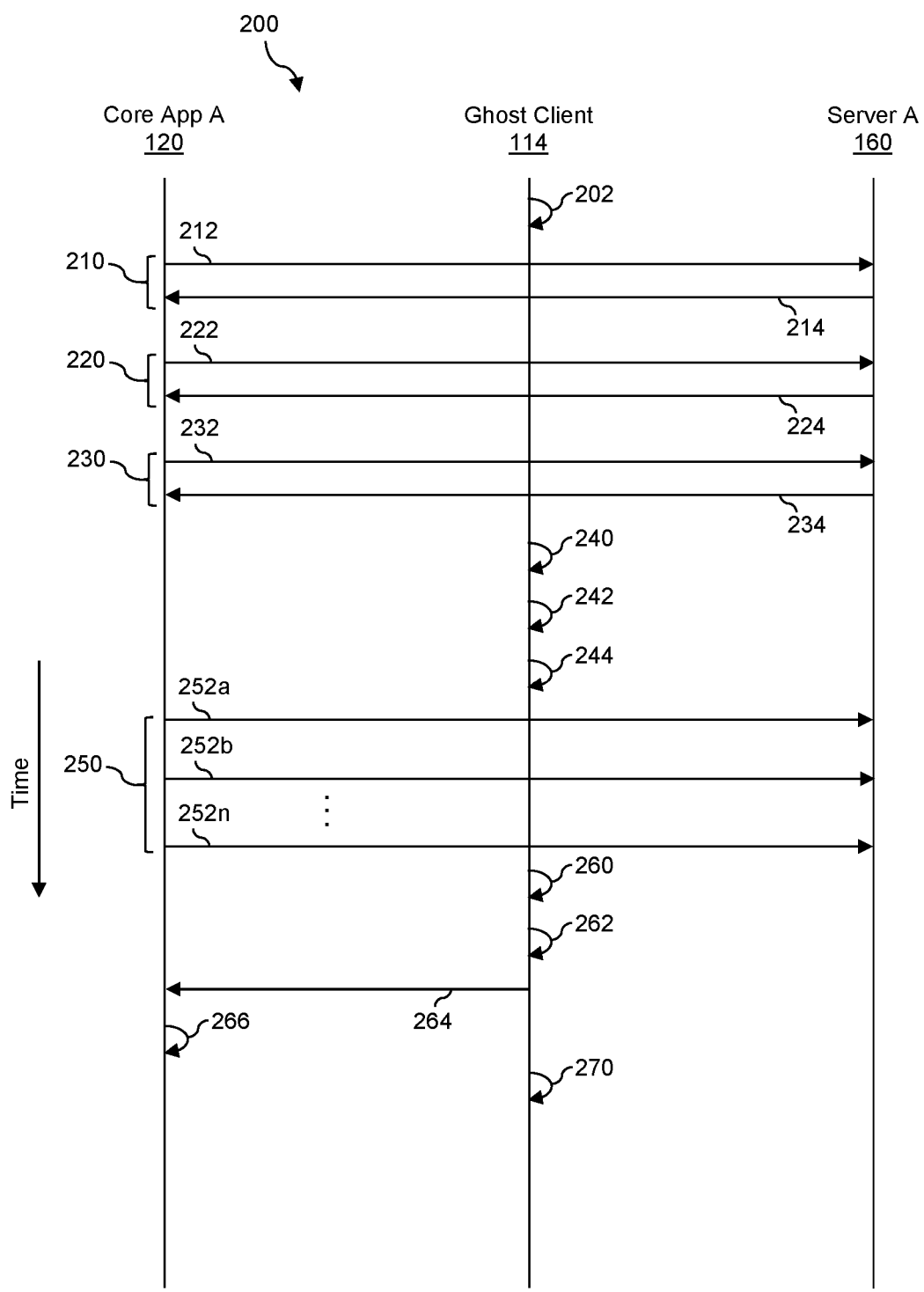
FIG. 2 is a message sequence diagram illustrating an example method according to an embodiment of the disclosure.
Figure 3:
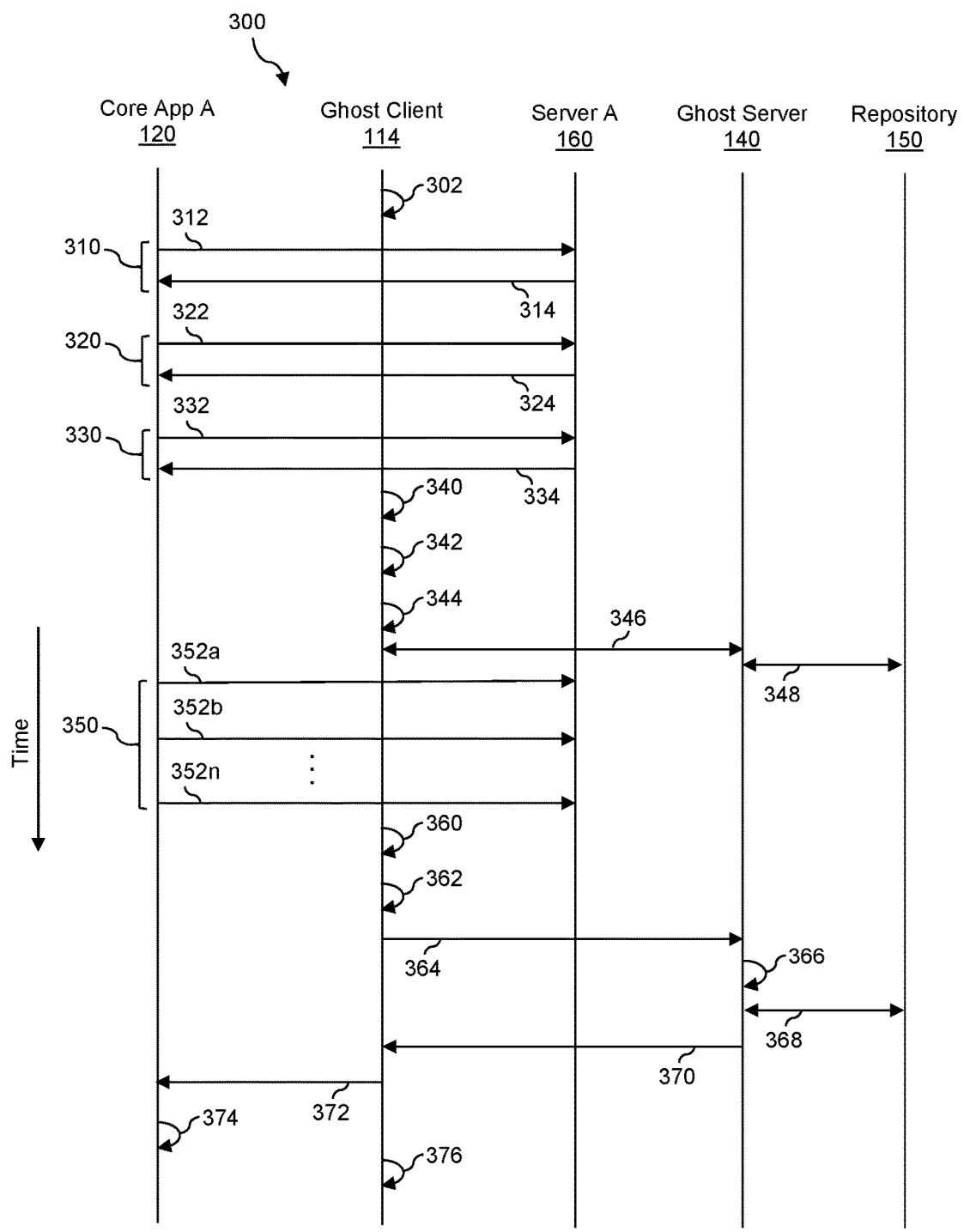
FIG. 3 is a message sequence diagram illustrating another example method according to an embodiment of the disclosure.

FIGS. 2 and 3 are flowcharts of example method 200 and method 300, respectively, for correcting connectivity failures of core applications on a UE. The methods 200 and 300 may be implemented, in whole or in part, by embodiments disclosed herein, such as system 100 of FIG. 1, or another suitable non-generic device and/or non-generic system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

Turning now to FIG. 2 with reference to elements of FIG. 1, a method 200 of correcting connectivity failures of core applications on a UE is disclosed. At step 202, the method includes detecting, via execution of a ghost client 114 on a processor of the UE from memory, a plurality of request-reply message sequences 210, 220, and 230 which are between a core application of a plurality of core applications and a corresponding server, such as core application A 120 and server A 160 as illustrated. Each request-reply message sequence 210, 220, and 230 illustrates a sequence without connection errors (i.e., failures) because each sequence comprises a request message followed by a reply message having reply information. For example, request-reply message sequence 210 does not demonstrate a connection error because it comprises request message 212 followed by reply message 214 from the server A 160 which provides reply information that satisfies the core application A 120, such as status update of "alive" and/or "in maintenance". Similarly, request-reply message sequences 220, 230 include request messages 222, 232 followed by reply messages 224, 234, respectively. It is understood that there may be a periodic and/or aperiodic time delay between each request-reply message sequence 210, 220, 230 based on the defined call routines embedded in the different core applications at the system level on the UE.

The method 200 continues at step 240 where the ghost client 114 is learning a set of ghost reply messages over a defined time period, such as a time period that covers multiple request-reply message sequences 210, 220, 230. Specifically, the ghost client 114 may be learning that reply messages 214, 224, and 234 within the request-reply message sequences 210, 220, and 230, respectively, are coming from the corresponding server (e.g., server A 160) and are not producing a connection error between the core application A 120 and corresponding server 160. The reply messages and the reply information included therein may be formed into a set.

Based on the set of reply messages 214, 224, and 234, the method 200 continues at step 242 by the ghost client 114 creating a series of ghost replies, where each ghost reply mimics a reply—and reply information included therein—from the corresponding server, such as one of the reply messages 214, 224, 234. In some embodiments, the ghost client 114 may create multiple series of ghost replies, where each series corresponds to one of the core applications on the UE and each ghost reply in the series has reply information associated with the request message sent by the core application. In an embodiment, each of the plurality of core applications are executing on a system level of the UE and each of the core applications do not receive at least one of an update and patch that overwrites and/or alters the core applications in an attempt to resolve connection errors. In some embodiments, the method includes instantiating, by the ghost client, an identifier for each series of ghost replies created by the ghost client. The identifier may correspond with at least one of the plurality of core applications such that the ghost replies are retrievable by the ghost client based on the identifier.

The method 200 continues at step 244 by the ghost client retaining the series of ghost replies within the memory of the UE. In some embodiments, the series of ghost replies may be retained in memory of the UE at the application level (i.e., in non-transitory memory which can be altered and/or overwritten by the ghost client) while the ghost client resides at the system level of the UE (i.e., in memory that cannot be altered or overwritten). In some embodiments, the ghost client resides at the system level of the UE being embedded in at least one of an operating system of the UE, a kernel of the operating system, a firmware of the UE, or any combination thereof.

Subsequent to retaining the series of ghost replies, the method 200 continues at step 250 in which the core application A 120 initiates multiple request messages 252*a*, 252*b*, through 252*n* that are unanswered by the corresponding server (e.g., server A 160) due to a lack of reply by the corresponding server. In some embodiments, the request messages are unanswered (e.g., request messages 252*a*, 252*b*, through 252*n*) due to a lack of reply that is based on at least one of a destination address (e.g., a Uniform Resource Locator) no longer existing at the corresponding server and the corresponding server no longer being in operation. For example, after retaining the series of ghost replies, server A 160 may switch destination addresses and/or no longer have an access policy with a wireless provider for the UE, and thus be considered to be no longer in operation because the server A 160 ignores request messages 252*a*, 252*b*, through 252*n* coming from core application A 120.

At step 260, the method 200 continues by the ghost client 114 detecting that the core application has exceeded a threshold number of request messages that are unanswered by the corresponding server A 160 due to a lack of reply, thereby resulting in connection errors more than the threshold number. The threshold number may be defined with reference to a predefined period of time, such as a threshold number of request messages sent and unanswered over a predefined period of time such as five seconds, ten seconds, one minute, fourteen days, one month, or another defined time period. Although illustrated as three request messages 252*a*, 252*b*, through 252*n* that are unanswered, it is understood that the ghost client 114 may set and adjust what the threshold number should be for each core application, such as setting the threshold number for core application A at two, while setting a different threshold number—five—for a different core application (e.g., core application B 122 of system 100). At step 262, the ghost client 114 retrieves the ghost reply that corresponds with both the core application and request message that is unanswered by the corresponding server. For example, the ghost client 114 retrieves a ghost reply that corresponds with core application A 120 and the request messages 252a, 252b, through 252n in request messages of step 250 that were unanswered by server A 160.

Based on the detecting, the method 200 continues at step 264 by the ghost client 114 feeding a ghost reply from the retained series to the core application A 120. Feeding the ghost reply to the core application induces the core application to continue execution on the UE. In some embodiments, the method also includes the ghost client 114 determining whether the core application A 120 is associated with a security restriction defined by the operating system of the UE. If a security restriction exists for the core application A 120, then the ghost reply would not be fed to the core application. Thus, in some embodiments, feeding the ghost reply to the core application A 120 is responsive to determination that the core application is not associated with the security restriction.

The method 200 may also include step 266 where the core application 120 analyzes the ghost reply fed to it by the ghost client 114, and in response to determining that the ghost reply includes reply information that is expected from the server A 160, continues execution on the UE without producing a connection error and without actually connecting to the server A 160 because the reply information was comprised within the ghost reply from the ghost client 114. The method 200 continues at step 270 with the ghost client 114 verifying that the ghost reply was accepted by the core application A 120 without the core application A 120 making a connection with the corresponding server (i.e., server A 160). In some embodiments, verifying that the ghost reply was accepted includes confirming that the core application A 120 ceases sending request messages based on receipt of the ghost reply, thus ending the continued, but unanswered, request messages and correcting the connection errors.

Turning now to FIG. 3 with reference to an embodiment of elements of FIG. 1, another method 300 of correcting connectivity failures of core applications on a UE is disclosed. At step 302, the method 300 includes detecting, via execution of a ghost client 114 on a processor of the UE from memory, a plurality of request-reply message sequences 310, 320, and 330 which are between a core application A 120 of a plurality of core applications and a corresponding server, such as server A 160. Each request-reply message sequence 310, 320, and 330 illustrates a sequence without connection errors (i.e., failures) because each sequence comprises a request message (e.g., 312, 322, 332) followed by a reply message having reply information (e.g., 314, 324, 334). For example, request-reply message sequence 310 does not demonstrate a connection error because it comprises request message 312 followed by reply message 314 from the server A 160 which provides reply information that satisfies the core application A 120, such as status update of "alive" and/or "in maintenance". Similarly, request-reply message sequences 320, 330 include request messages 322, 332 followed by reply messages 324, 334, respectively. It is understood that there may be a periodic and/or aperiodic time delay between each request-reply message sequence 310, 320, 330 based on the defined call routines embedded in the different core applications at the system level on the UE.

The method 300 continues at step 340 where the ghost client 114 is learning a set of ghost reply messages over a defined time period, such as a time period that covers multiple request-reply message sequences 310, 320, 330. Specifically, the ghost client 114 may be learning that reply messages 314, 324, and 334 within the request-reply message sequences 310, 320, and 330, respectively, are coming from the corresponding server (e.g., server A 160) and are not producing a connection error between the core application 120 and corresponding server A 160. As such, the reply messages (e.g., 314, 324, 334) and the reply information included therein may be formed into a set.

Based on the set of reply messages 314, 324, and 334, the method 300 continues at step 342 by the ghost client 114 creating a series of ghost replies, where each ghost reply mimics a reply—and reply information included therein— from the corresponding server, such as one of the reply messages 314, 324, 334. In some embodiments, the ghost client 114 may create multiple series of ghost replies, where each series corresponds to one of the core applications on the UE and each ghost reply in the series has reply information associated with the request message sent by the core application. Put simply, the ghost replies are based on the reply messages 314, 324, and 334 from the corresponding server A 120. In an embodiment, each of the plurality of core applications are executing on a system level of the UE and each of the core applications do not receive at least one of an update and patch that overwrites and/or alters the core applications in an attempt to resolve connection errors. In some embodiments, the method includes instantiating, by the ghost client, an identifier for each series of ghost replies created by the ghost client. The identifier may correspond with at least one of the plurality of core applications such that the ghost replies are retrievable by the ghost client based on the identifier.

The method 300 continues at step 344 by the ghost client 114 retaining the series on a memory communicatively coupled to the UE via a wireless network. For example, the ghost client 114 at step 346 transmits one or more ghost replies in the series of ghost replies to the ghost server 140. The ghost server 140 may identify which core application on the UE the series of ghost replies corresponds to, and then may instantiate the series of ghost replies in non-transitory memory of ghost repository 150 at step 348. In some embodiments, ghost server 140 may relay confirmation to the ghost client 114 on the UE that the series of ghost replies was retained.

The method 300 continues at step 350 in which the core application A 120 initiates multiple request messages 352a, 352b, through 352n that are unanswered by the corresponding server (e.g., server A 160) due to a lack of reply by the corresponding server A 160. In some embodiments, the request messages are unanswered (e.g., request messages 352a, 352b, through 352n) due to a lack of reply that is based on at least one of a destination address (e.g., a URL) no longer existing at the corresponding server and the corresponding server no longer being in operation. For example, after retaining the series of ghost replies, server A 160 may change and/or deactivate destination addresses and/or no longer have an access policy with a wireless provider for the UE, and thus be considered to be no longer in operation because the server A 160 ignores request messages 352a, 352b, through 352n coming from core application A 120.

At step 360, the method continues by the ghost client 114 determining that the core application is experiencing a frequency of connection errors (i.e., multiple number of connection errors) with the corresponding server A 160 in excess of a predefined threshold. The threshold number may be defined with reference to a predefined period of time, such as a threshold number of request messages sent and unanswered over a predefined period of time such as five seconds, ten seconds, one minute, fourteen days, one month, or another defined time period. The connection errors may occur because the number of request messages (e.g., 352a, 352b, through 352n) are unanswered by the corresponding server A 160 due to a lack of reply. Although illustrated as three request messages 352a, 352b, through 352n that are unanswered, it is understood that the ghost client 114 may set and adjust what the predefined threshold (i.e., defined number) should be for each core application, such as setting the threshold number for core application A 120 at two, while setting a different threshold number—seven—for a different core application (e.g., core application B 122 of system 100).

Responsive to the frequency of connection errors exceeding the predefined threshold, at step 362, the method 300 continues by the ghost client 114 obtaining a ghost reply from the retained series and the ghost reply corresponds to at least the core application A 120. For example, the ghost client 114 at step 364 requests the ghost reply from the ghost management server 140 and may include an identifier for core application A 120. At step 366, the ghost management server 140 identifies the proper ghost reply (i.e., the ghost reply that corresponds with core application A 120 and the request messages 352a, 352b, through 352n in request-reply message sequence 350 that were unanswered by server A 160). At step 368, the ghost server 140 is retrieving the ghost reply from ghost repository 150. At step 370, the method 300 continues by sending the ghost reply back to the ghost client 114.

The method 300 continues at step 372 by the ghost client 114 feeding the ghost reply from the retained series to the core application A 120 and by doing so, the ghost reply maintains execution of the core application A 120. Feeding the ghost reply to the core application induces the core application to continue execution on the UE.

In some embodiments, the method 300 continues at step 374 by the core application 120 analyzing the ghost reply fed to it by the ghost client 114 at step 372, and in response to determining that the ghost reply includes reply information that is expected from the server A 160, continues execution on the UE without producing a connection error and without actually connecting to the server A 160 because the reply information was comprised within the ghost reply from the ghost client 114. In some embodiments, the method 300 continues at step 376 by the ghost client 114 verifying that the ghost reply resolved the one or more connection errors of the core application A 120 without the core application A 120 making a connection with the corresponding server (i.e., receiving a response from the corresponding server A 160 and thus acknowledging a connection was made). In some embodiments, verifying that the ghost reply was accepted includes confirming that the core application A 120 ceases sending request messages based on receipt of the ghost reply, thus resolving the connection errors by ending the continuous, but unanswered, request message loop.

FIG. 4 depicts an embodiment of user equipment (UE) 400, which is operable for implementing aspects of the present disclosure, but the present disclosure should not be limited to these implementations. Though illustrated as a mobile smart phone, the UE 400 may take various forms including a wireless handset, a pager, a personal digital assistant (PDA), a gaming device, or a media player. The UE 400 may be an example of and/or a specific embodiment of the UE 102 discussed above with reference to FIGS. 1, 2, and 3. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. Some of the application icons 404 may be associated with applications installed by default installation and/or selected based on customization logic or rules as applied based on the individual profile, demographics, and/or history of a user associated with the UE 400.

In some embodiments of the UE 400, a user may be able to download and install additional applications on the UE 400, and an icon associated with such downloaded and installed applications may be added to the touch screen display 402 or to an alternative screen. As discussed with respect to the UE 102 of system 100, the user may not be allowed to download core applications to the UE and/or download, load, overwriter, and/or otherwise alter the core applications and their corresponding embedded destination addresses by means of updates and patches. This is because the user applications do not have access system level of the UE 400. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands.

These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
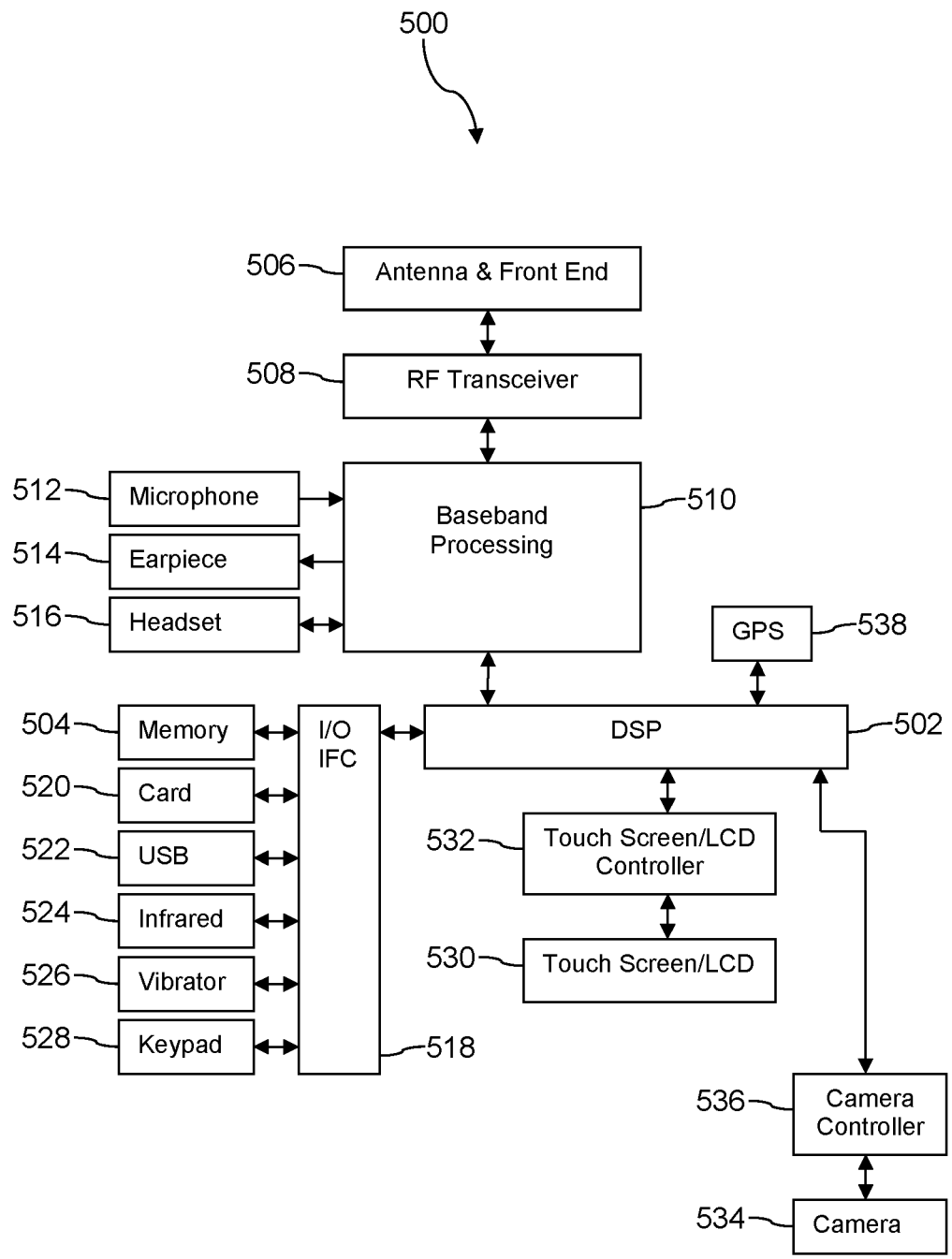
FIG. 5 is a block diagram of a hardware architecture of a user equipment according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
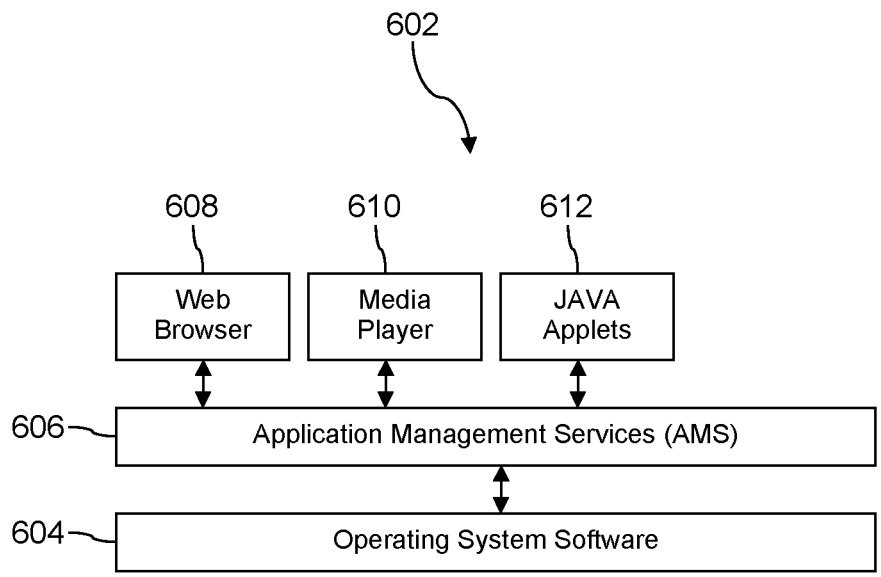
FIG. 6A is a block diagram of a software architecture of a user equipment according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
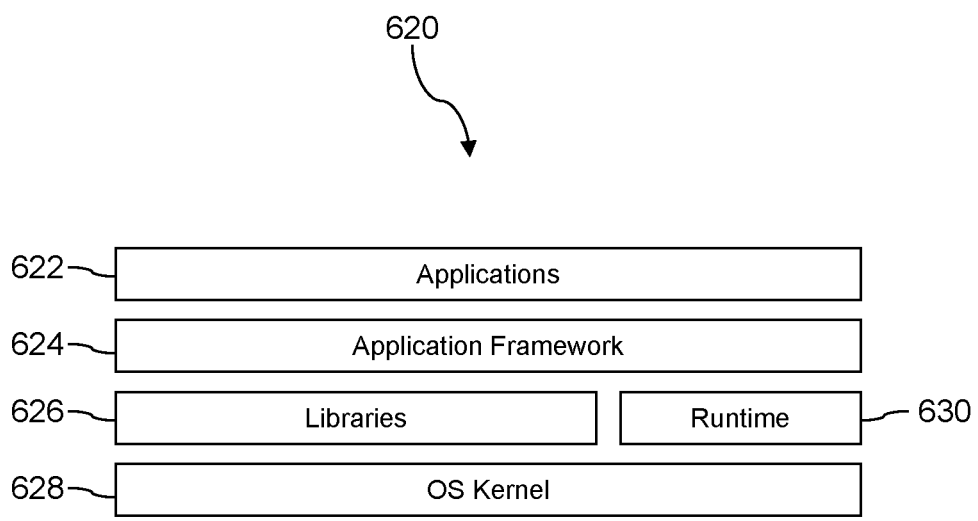
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630, which reside at the system level of the User Equipment and, in some embodiments, may not their content (e.g., destination addresses) may not be alterable via download and interaction of software from a server over a network. As mentioned above with respect to system 100 of FIG. 1, the core applications (e.g., 120, 122, 124) and the ghost client 114 may reside at the system level. The DSP 502 executes applications 622 that may execute in the execution runtime 630 and may rely upon services provided by the application framework 624. Applications 622 and the application framework 624 may rely upon functionality provided via the libraries 626.

Figure 7:
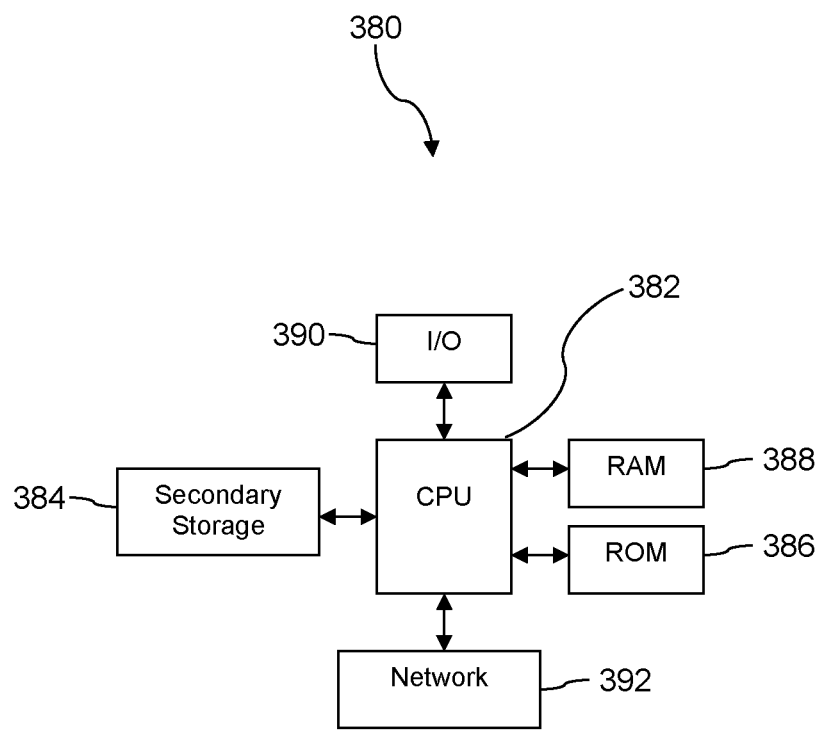
FIG. 7 illustrates an exemplary computer system suitable for implementing the several embodiments of the disclosure.

FIG. 7 illustrates a computer system 380 suitable for implementing one or more embodiments disclosed herein, such as elements of system 100 in FIG. 1, including one or more UE 102, server 140, repository 150, server A 160, server B 170, server N 180, and operations disclosed in FIGS. 2 and 3. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. It is understood that use of the term "memory" in the claims does not include transitory signals. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine, sometimes referred to as a special purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprised on one or more non-transitory computer readable storage medium having computer usable program code embodied therein to implement the functionality disclosed above. The computer program product may comprise data structures, executable instructions, and other computer usable program code. The computer program product may be embodied in removable computer storage media, non-removable computer storage media, or any combination therein. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for correcting connectivity failures of core applications on a user equipment (UE), the method comprising:
   detecting, via execution of a client on a processor of the UE, a plurality of request-reply message sequences between a core application of a plurality of core applications and a corresponding server;
   learning, by execution of the client, a set of reply messages within the plurality of request-reply message sequences that are coming from the corresponding server and not producing a connection error with the corresponding server;
   based on the set of reply messages, creating, by execution of a ghost client on the processor of the UE, a series of ghost replies that each mimics a reply that is one of the set of learned reply messages coming from the corresponding server;
   retaining, by execution of the client within a memory of the UE, the series of ghost replies;
   subsequent to retaining the series of ghost replies, detecting, by the client, that the core application has exceeded a threshold number of request messages that are unanswered by the corresponding server due to a lack of reply by the corresponding server; and
   based on the detecting, feeding, by execution of the client, a ghost reply from the retained series to the core application.

2. The method of claim 1, further comprising verifying, by execution of the client, that the ghost reply was accepted by the core application without the core application making a connection with the corresponding server.

3. The method of claim 1, wherein the client is embedded in at least one of an operating system of the UE and a firmware of the UE.

4. The method of claim 1, wherein each of the plurality of core applications are executing on a system level of the UE.

5. The method of claim 1, wherein the request messages that are unanswered by the corresponding server due a lack of reply by the corresponding server are based on at least one of a Uniform Resource Locator no longer existing at the corresponding server and the corresponding server no longer being in operation.

6. The method of claim 1, further comprising determining, by the ghost client, whether the core application is associated with a security restriction defined by an operating system of the UE, wherein feeding the ghost reply to the core application is responsive to determination that the core application is not associated with the security restriction.

7. The method of claim 1, further comprising instantiating, by the ghost client, an identifier for each series of ghost replies created by the ghost client.

8. The method of claim 7, wherein the identifier corresponds with at least one of the plurality of core applications such that ghost replies are retrievable based on the identifier.

9. A system for correcting connectivity failures of core applications on a user equipment (UE), the system comprising:
   a UE comprising:
      a transceiver;
      a memory storing a plurality of core applications; a processor; and
      a client stored in the memory that, upon being executed and configuring the processor, the processor:
         detects a plurality of request-reply message sequences between a core application of the plurality of core applications and a corresponding server via the transceiver;
         learns, over a defined time period, a set of reply messages within the plurality of request-reply message sequences that do not produce a connection error with the corresponding server;

creates a series of ghost replies that each mimics a reply that is one of the set of learned reply messages coming from the corresponding server and not producing a connection error;

retains the series of ghost replies within the memory;

subsequent to retention of the series of ghost replies, detects that the core application has exceeded a threshold number of request messages that are unanswered by the corresponding server due to a lack of reply by the corresponding server; and based on the detection, feeds a ghost reply from the retained series to the core application.

10. The system of claim 9, wherein the client further configures the processor to verify that the ghost reply was accepted by the core application without the core application making a connection with the corresponding server.

11. The system of claim 9, wherein the client is embedded in at least one of an operating system of the UE and a firmware of the UE.

12. The system of claim 9, wherein each of the plurality of core applications are executing on a system level of the UE and do not receive at least one of an update and patch that overwrite or alter the core applications to resolve connection errors.

13. The system of claim 9, wherein the request messages that are unanswered by the corresponding server due a lack of reply by the corresponding server are based on at least one of a Uniform Resource Locator no longer existing at the corresponding server and the corresponding server no longer being in operation.

14. The system of claim 9, wherein the client further configures the processor to: determine whether the core application is associated with a security restriction defined by an operating system of the UE, wherein the ghost reply is fed to the core application responsive to a determination that the core application is not associated with the security restriction.

15. The system of claim 9, wherein the client further configures the processor to: instantiate an identifier for each series of ghost replies created by the client.

16. The system of claim 15, wherein the identifier corresponds with at least one of the plurality of core applications such that ghost replies are retrievable based on the identifier.

17. A method for correcting connectivity failures of core applications on a user equipment (UE), the method comprising:

detecting, via execution of a client on a processor of the UE, a plurality of request-reply message sequences between a core application of a plurality of core applications and a corresponding server;

learning, by execution of the client over a defined time period, a set of reply messages within the plurality of request-reply message sequences that are not producing a connection error with the corresponding server;

creating, by execution of the client, a series of ghost replies that each mimics a reply that is one of the set of learned reply messages coming from the corresponding server and not producing a connection error;

retaining, by execution of the client, the series of ghost replies on a memory communicatively coupled to the UE via a wireless network;

determining, by the client, that the core application is experiencing a frequency of connection errors with the corresponding server in excess of a predefined threshold;

responsive to the frequency of connection errors exceeding the predefined threshold, obtaining, by the client, a ghost reply from the retained series corresponding to the core application; and feeding, by execution of the client, the ghost reply from the retained series to the core application, wherein the ghost reply maintains execution of the core application.

18. The method of claim 17, further comprising: verifying, by execution of the client, that the ghost reply resolved the at least one connection error without the core application making a connection with the corresponding server.

19. The method of claim 17, wherein each of the plurality of core applications are executing on a system level of the UE and do not receive at least one of an update and patch that overwrite or alter the core applications to resolve connection errors.

20. The method of claim 17, wherein the connection error is based on request messages from the core application going unanswered by the corresponding server due to at least one of a Uniform Resource Locator no longer existing at the corresponding server and the corresponding server no longer being in operation.

* * * * *